E. W. TUCKER.
CAMERA.
APPLICATION FILED AUG. 16, 1916.
1,242,745.
Patented Oct. 9, 1917.
2 SHEETS—SHEET 2.
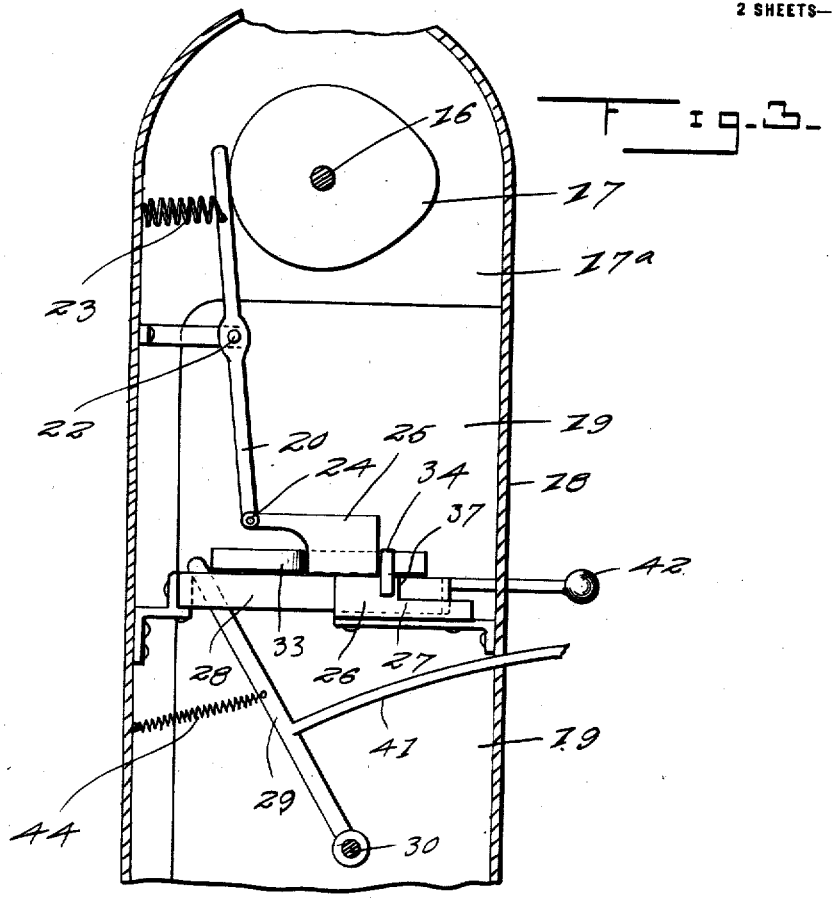
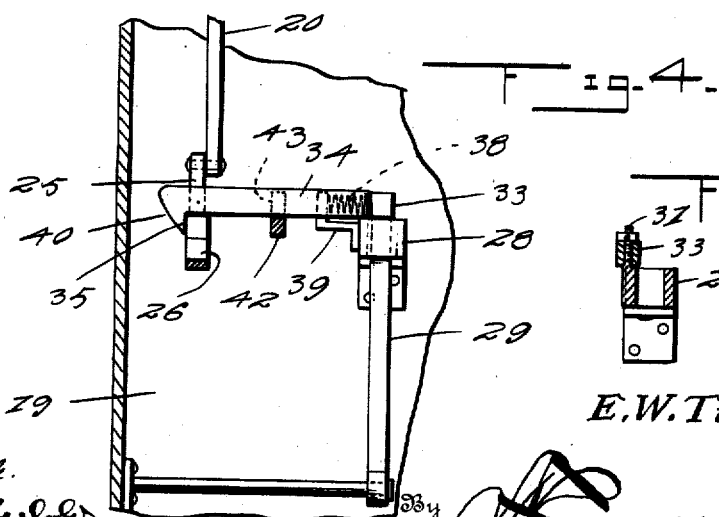
Witness
Inventor
E. W. Tucker,
By
Attorney

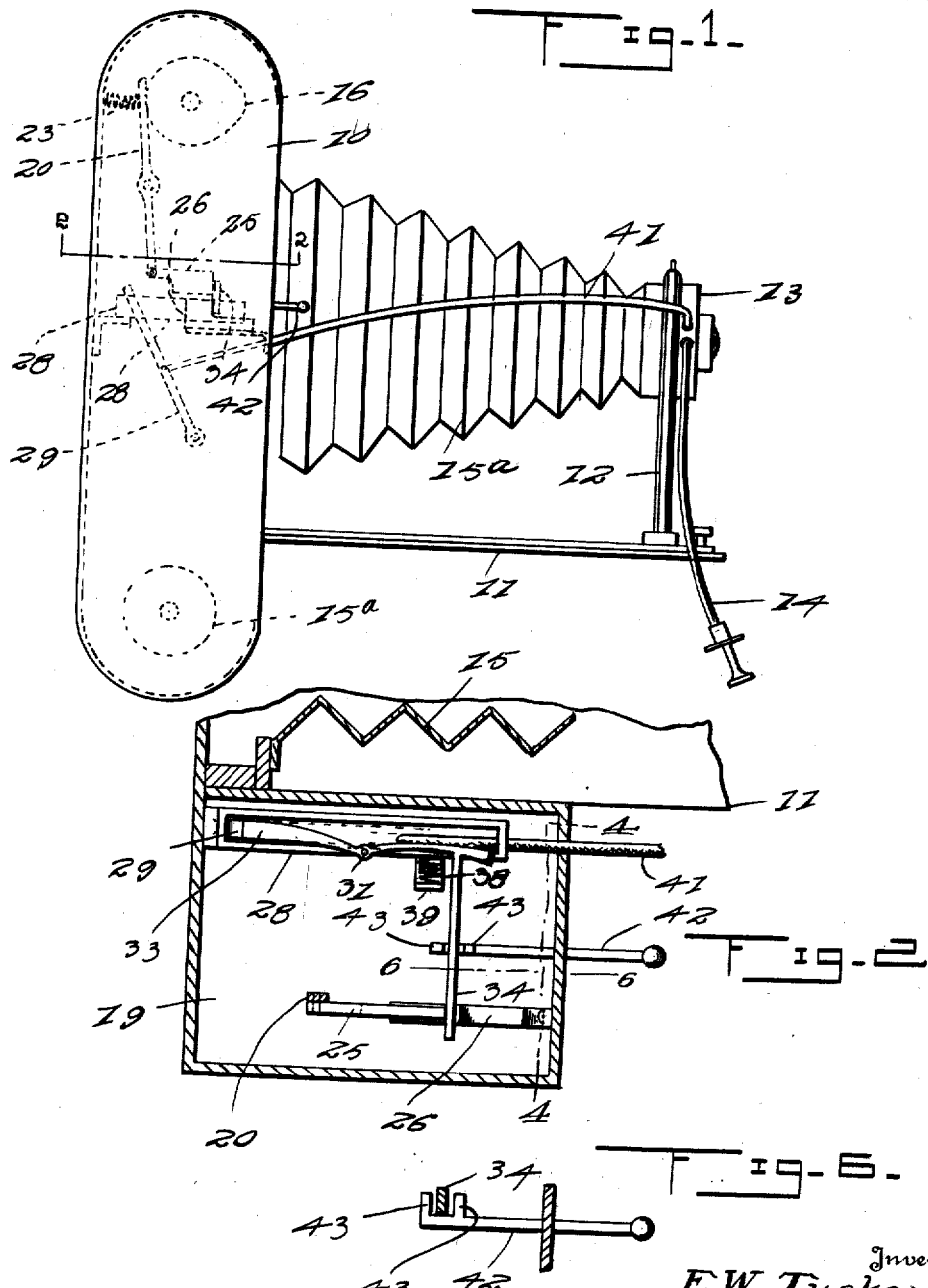

UNITED STATES PATENT OFFICE.

EDWIN W. TUCKER, OF NORTH PRAIRIE, WISCONSIN.

CAMERA.

1,242,745.   Specification of Letters Patent.   Patented Oct. 9, 1917.

Application filed August 16, 1916. Serial No. 115,225.

*To all whom it may concern:*

Be it known that I, EDWIN W. TUCKER, a citizen of the United States, residing at North Prairie, in the county of Waukesha and State of Wisconsin, have invented certain new and useful Improvements in Cameras; and I do hereby declare the following to be a full, clear, and exact description of the invention, such as will enable others skilled in the art to which it appertains to make and use the same.

This invention relates to improvements in cameras, and has for its primary object to provide means whereby the shutter of the camera is automatically locked against operation subsequent to the initial exposure of each section of the film, thereby preventing double exposure of any one film section.

Another object of this invention is the provision of a shutter locking device and means associated therewith for automatically releasing the shutter when the exposed section of the film is wound upon the film receiving spool and a new section thereof presented for exposure behind the exposure opening of the camera.

With these and other objects in view the invention consists in such novel features of construction, combination and arrangement of parts as will be hereinafter more fully described and illustrated in the accompanying drawings, in which:

Figure 1 represents a side elevation of a well known type of camera illustrating the improved shutter locking device applied thereto, Fig. 2 represents a fragmentary horizontal sectional view on the line 2—2 of Fig. 1, Fig. 3 represents a fragmentary vertical sectional view through the side wall of the camera illustrated in Fig. 1 showing a portion of the locking mechanism in detail, Fig. 4 represents a transverse sectional view on the line 4—4 of Fig. 2.

Fig. 5 represents a detail sectional view through the rectangular guide frame for one of the pivoted arms of the lock mechanism, showing one of the pivoted spring levers in section, Fig. 6 represents a detail sectional view on the line 6—6 of Fig. 2.

Referring to the drawings in detail, wherein similar reference numerals designate corresponding parts throughout the several views, the numeral 10 indicates the casing or body of a well known type of camera having the usual pivoted front or bed 11 supporting the bellows supports 12. The shutter casing 13 is secured in the supports 12 and is provided with the usual or any preferred type of actuating device 14, which, in the accompanying drawings, is in the form of a cable release. The forward extremity of the bellows 15 is secured to the shutter casing 13 and the rear portion thereof is secured to the edge of the exposure opening of the casing 10. The opposite ends of the casing 10 are provided with the usual film receiving chambers in which are supported the film feeding spool 15ª and the film receiving spool 16, the flange of which latter is formed with a projection or cam 17.

One side wall 18 of the camera casing is formed with a chamber 19 which communicates with the film receiving spool chamber 17ª and a lever 20 is pivotally supported at 22 in the chamber 19. The upper terminal of the lever 20 is normally retained in engagement with the cam flange 17 of the spool 16 by the tension of a spring 23 and is adapted to be oscillated during rotation of the spool 16 by the cam 17.

The lower terminal of the lever 20 is pivotally secured at 24 to a slide plate 25 which is slidably supported upon a guide plate 26 suitably supported in the chamber 19 and having the forward portion of the upper edge thereof cut away as indicated at 27.

A substantially rectangular guide frame 28 is supported in the chamber 19 inwardly of the guide plate 26 and receives the upper terminal of an arm 29 which latter is pivotally secured at 30 in the chamber 19 and is adapted to oscillate back and forth in the frame 28. The central portion of one of the side members of the frame 28 is formed with an integral upstanding trunnion 31 on which is pivotally secured the spring lever 33, one end of which carries an integral laterally projecting spring latch 34 having a horizontal shoulder 35 adapted to engage behind the guide plate 26 to lock the lever 33 in operative position. The spring catch 34 is adapted to be flexed laterally so as to pass the shoulder 37 defined by the cutaway portion 27 of the guide plate 26 when said latch is engaged, adjacent its free end, by the slide plate 25 during the rotation of the film receiving spool 16. When the tooth or shoulder 35 of the latch is disengaged from the shoulder 37 of the guide plate 26, the adjacent terminal of the spring lever 33 is swung inwardly of the camera casing 10 under the influence of a spring 38 which latter is confined in a holder 39 suitably supported in the chamber 19.

In its normal position, the arm 29 is in rearwardly inclined position, and is locked in this position by the rear end of the spring lever 33, as shown in Fig. 2. When the lever 33 is released, coincident with the disengagement of the tooth of the latch 34 from the shoulder 37, the lever is swung by the spring 38 thereby moving the rear terminal of said lever out of the path of the pivoted arm 29 and permitting the latter to swing forwardly. During the forward movement of the arm 29 the forward extremity of the lever 33 is engaged thereby and moved outwardly, together with the latch 34 and moving the rear beveled extremity 40 of the latter over the guide plate 26 and engaging the tooth 35 behind the guide plate so as to lock the lever 33 in operative position. The pivoted arm 29 is connected intermediate its ends with a cable or other flexible element 41 which is extended forwardly through the front wall of the chamber 19 and it is connected with the actuating lever (not shown) of the shutter 13, whereby when said shutter is actuated, a forward pull is exerted upon the cable 41 thus taking the arm 29 forwardly therewith. The spring latch 34 may be manually released from engagement with the guide plate 26 by a finger release member 42 which is extended forwardly to the wall of the chamber 19 and is provided at its rear extremity with upstanding lugs 43 which partially embrace the medial portion of the latch 34.

In use, a film is positioned in the camera in the usual manner and the first section thereof is moved into position behind the exposure opening of the casing 10 by winding the film backing strip upon the film receiving spool 16. The exposure of the first section of the film is effected by opening the shutter by the cable release device 14 and simultaneously with the operation of the camera shutter, a forward longitudinal pull is exerted upon the cable 41 which effects a forward swinging movement of the arm 29 and during the forward movement of said arm, the upper extremity thereof engages the curved forward end of the lever 33 and engaging the tooth 35 of the spring latch 34 behind the guide plate 26. The slide plate 25 is preferably constructed of spring metal so that in case said slide plate is disposed in the path of the spring latch 34 at the time that the shutter is actuated, said slide plate will be flexed laterally so as to permit the tooth 40 of the latch 34 to engage behind the guide plate 26. Subsequent to an operation of the shutter the cable 41 is released and the arm 29 is moved rearwardly under the influence of the spring 44. During the rearward or return movement of the arm 29 the upper extremity of the latter flexes the rear extremity of the spring lever 33 which latter, when the upper terminal of the arm passes it, swings outwardly in the path of the arm and locks the latter in its initial position and thus positively locks the shutter 13 against operation, and further preventing a double exposure of any one section of the film. The arm 29 is released when the next section of the film is presented for exposure so as to permit of a subsequent operation of the shutter 13 by the cam 17 which oscillates the lever 20 and moves the slide plate 25 forwardly against the rear extremity of the latch 34 thus disengaging the said tooth 35 of the latter from the guide plate 26 and permitting the forward extremity of the lever 33 to be swung inwardly under the influence of the spring 38.

What I claim is:—

1. A camera including a casing, a film receiving spool supported in said casing, a shutter, means for automatically locking said shutter against operation subsequent to an operation thereof, a cam on said film receiving spool, and means operable by said cam during the rotation of said spool to release said locking means to permit operation of the said shutter.

2. A camera including a casing, a film receiving spool supported in said casing, a shutter, an arm pivotally supported in said casing, means independent of said spool to lock said arm in one position, flexible means connecting said arm with said shutter for locking the latter against operation, and means controlled by said receiving spool for releasing said locking means.

3. A camera including a casing, a film-receiving spool supported therein, a cam flange carried by said spool, a shutter, means to lock said shutter against operation, and means controlled by the cam flange for releasing the locking means.

4. A camera including a casing, a film-receiving spool supported therein, a shutter, means to lock said shutter against operation, a lever pivotally mounted in said casing, means carried by the spool for actuating said lever, and means operable by the lever to release the locking means.

5. A camera including a casing, a shutter, an arm pivotally mounted in said casing, means connecting said arm with said shutter, a spring lever adapted to engage and lock said arm in inoperative position, and means to lock said lever in engagement with said arm.

6. A camera including a casing, a shutter, an arm pivotally mounted in said casing, means connecting said arm with said shutter, a spring lever pivotally supported in said casing and adapted to engage and lock said arm in inoperative position, means to lock said lever in operative position with relation to said arm, and means for releasing the last-mentioned means.

7. A camera including a casing, a shutter, an arm pivotally mounted in said casing, means connecting said arm with said shutter, a pivoted lever for locking said arm in inoperative position, means normally tending to swing said lever out of engagement with said arm, and means to lock said lever in engagement with said arm.

8. A camera including a casing, a shutter, an arm pivotally mounted in said casing, means connecting said arm with said shutter, a lever pivotally mounted in said casing and movable against said arm to lock the latter in inoperative position, means normally tending to move said lever out of engagement with said arm, and releasable means for locking said lever in engagement with said arm.

9. A camera including a casing, a shutter, an arm pivotally mounted in said casing, means connecting said arm with said shutter, a flexible lever pivotally supported in said casing adapted to engage and lock the arm in inoperative position, means normally tending to move the lever to inoperative position, a film-receiving spool supported in said casing, a cam carried by said spool, and means operable by said cam to release the locking means.

In testimony whereof I affix my signature in presence of two witnesses.

EDWIN W. TUCKER.

Witnesses:
GILBERT MASON,
C. H. FINTEL.